United States Patent [19]

Powell

[11] 4,446,484

[45] May 1, 1984

[54] IMAGE GRADIENT DETECTORS OPERATING IN A PARTITIONED LOW-PASS CHANNEL

[75] Inventor: Philip G. Powell, Pinner, England

[73] Assignee: Eastman Kodak Company, Rochester, N.Y.

[21] Appl. No.: 328,543

[22] PCT Filed: Apr. 16, 1981

[86] PCT No.: PCT/GB 81/00074
§ 371 Date: Nov. 30, 1981
§ 102 Date: Nov. 30, 1981

[87] PCT Pub. No.: WO81/03097
PCT Pub. Date: Oct. 29, 1981

[51] Int. Cl.³ .......................... H04N 5/14; H04N 5/21
[52] U.S. Cl. ...................................... 358/166; 358/167
[58] Field of Search ................ 358/166, 284, 96, 167; 382/22, 54

[56] References Cited

U.S. PATENT DOCUMENTS

| | | | |
|---|---|---|---|
| 3,781,558 | 12/1973 | Anderson | 250/332 |
| 3,980,813 | 9/1976 | Shinkai | 178/7.1 |
| 3,987,243 | 10/1976 | Schwartz | 178/6.8 |
| 4,003,024 | 1/1977 | Riganati et al. | 340/146.3 H |
| 4,058,828 | 11/1977 | Ladd | 358/80 |
| 4,213,150 | 7/1980 | Robinson et al. | 358/166 |
| 4,220,972 | 9/1980 | Geokezas et al. | 358/166 |
| 4,259,694 | 3/1981 | Liao | 358/283 |

FOREIGN PATENT DOCUMENTS 2047934 12/1980 United Kingdom .

OTHER PUBLICATIONS

Rossi, "Digital Techniques for Reducing Television Noise", *SMPTE Journal*, Mar. 1978, vol. 87 pp. 134-140.

Robinson et al., "A Real-Time Edge Processing Unit", Workshop on Picture Data Description and Management, Apr. 21/22, 1977 (NY:IEEE) pp. 155-164.

Baker et al., "Multiple Bandpass Filters in Image Processing", IEEE Proceedings, vol. 127, Pt. E, No. 5, Sep. 1980, pp. 173-184.

*Primary Examiner*—John C. Martin
*Attorney, Agent, or Firm*—David M. Woods

[57] ABSTRACT

An electronic image processing system, for image enhancement and noise suppression, from signals representing an array of picture elements, or pels. The system is of the kind providing a feature-enhanced output by the addition of outputs of a high-pass filter acting as image-feature detector and a complementary low-pass filter. The low-pass filter also acts as an image-feature detector and includes a prefilter (130 and FIG. 22) and a sub-sampling filter (32) based on a set of weighting patterns in the form of sparse matrices (FIG. 23). The sub-sampling filter in a bandpass channel of the low-pass filter (206 and FIG. 28) comprises a pair of gradient detectors (210, 220, 230, 240 and FIGS. 32, 33, 34, 35) arranged back to back.

9 Claims, 37 Drawing Figures

| -1 | 2 | -1 |
|---|---|---|
| -1 | 2 | -1 |
| -1 | 2 | -1 |

FIG.2.
FIG.4.
FIG.6.
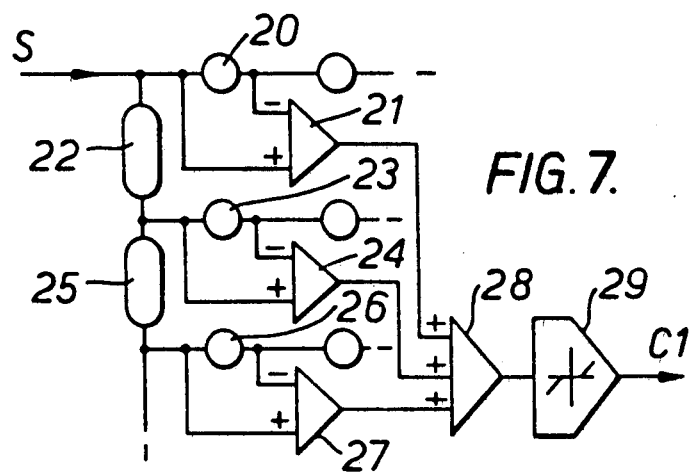
FIG.7.
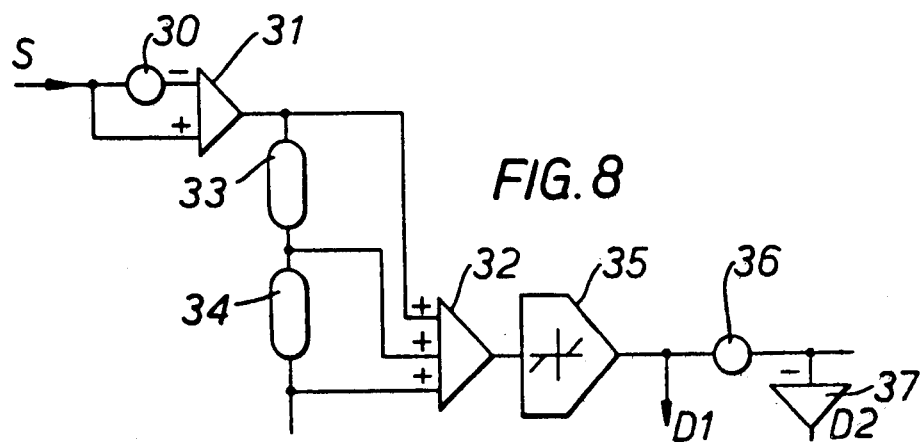
FIG.8

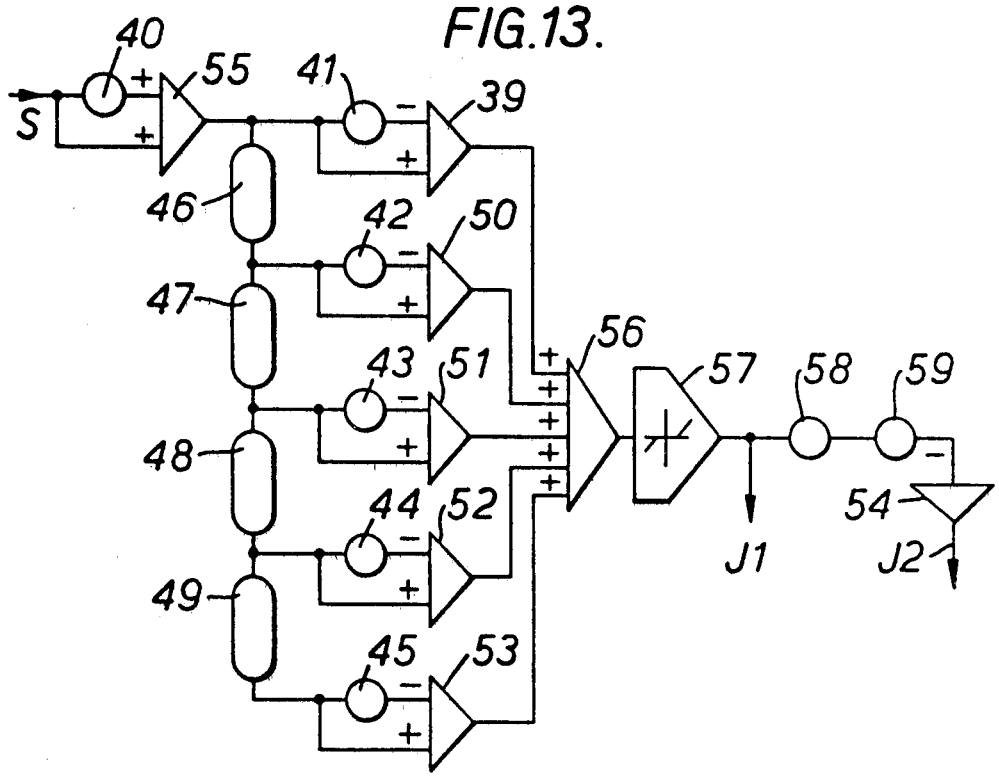

| 0 | 0 | 0 |
|---|---|---|
| -1 | 2 | -1 |
| 0 | 0 | 0 |

| 0 | 0 | 0 |
|---|---|---|
| -1 | 1 | 0 |
| 0 | 0 | 0 |

Q

| 0 | 0 | 0 |
|---|---|---|
| 0 | 1 | -1 |
| 0 | 0 | 0 |

| 1 | 1 | 1 |
|---|---|---|
| 1 | 1 | 1 |
| 1 | 1 | 1 |

FIG.23.

| 1 | 0 | 0 | 1 | 0 | 0 | 1 |
|---|---|---|---|---|---|---|
| 0 | 0 | 0 | 0 | 0 | 0 | 0 |
| 0 | 0 | 0 | 0 | 0 | 0 | 0 |
| 1 | 0 | 0 | 1 | 0 | 0 | 1 |
| 0 | 0 | 0 | 0 | 0 | 0 | 0 |
| 0 | 0 | 0 | 0 | 0 | 0 | 0 |
| 1 | 0 | 0 | 1 | 0 | 0 | 1 |

FIG.24.

| 1 | 1 | 1 | 1 | 1 | 1 | 1 | 1 | 1 |
|---|---|---|---|---|---|---|---|---|
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

FIG.26.

| -1 | 0 | 0 | 2 | 0 | 0 | -1 |
|----|---|---|---|---|---|----|
| 0  | 0 | 0 | 0 | 0 | 0 | 0  |
| 0  | 0 | 0 | 0 | 0 | 0 | 0  |
| -1 | 0 | 0 | 2 | 0 | 0 | -1 |
| 0  | 0 | 0 | 0 | 0 | 0 | 0  |
| 0  | 0 | 0 | 0 | 0 | 0 | 0  |
| -1 | 0 | 0 | 2 | 0 | 0 | -1 |

FIG.27.

| -1 | 0 | 0 | -1 | 0 | 0 | -1 |
|----|---|---|----|---|---|----|
| 0  | 0 | 0 | 0  | 0 | 0 | 0  |
| 0  | 0 | 0 | 0  | 0 | 0 | 0  |
| 2  | 0 | 0 | 2  | 0 | 0 | 2  |
| 0  | 0 | 0 | 0  | 0 | 0 | 0  |
| 0  | 0 | 0 | 0  | 0 | 0 | 0  |
| -1 | 0 | 0 | -1 | 0 | 0 | -1 |

FIG.31.

| -1 | 1 | 0 |
|---|---|---|
| -4 | 4 | 0 |
| -1 | 1 | 0 |

31A

| 0 | 1 | -1 |
|---|---|---|
| 0 | 4 | -4 |
| 0 | 1 | -1 |

31B

| -1 | -4 | -1 |
|---|---|---|
| 1 | 4 | 1 |
| 0 | 0 | 0 |

31C

| 0 | 0 | 0 |
|---|---|---|
| 1 | 4 | 1 |
| -1 | -4 | -1 |

| -1 | 0 | 0 | 1 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| -4 | 0 | 0 | 4 | 0 | 0 | 0 |
| 0 | 0 | 0 | 0 | 0 | 0 | 0 |
| 0 | 0 | 0 | 0 | 0 | 0 | 0 |
| -1 | 0 | 0 | 1 | 0 | 0 | 0 |

FIG.33.

| 0 | 0 | 0 | 1 | 0 | 0 | -1 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 4 | 0 | 0 | -4 |
| 0 | 0 | 0 | 0 | 0 | 0 | 0 |
| 0 | 0 | 0 | 0 | 0 | 0 | 0 |
| 0 | 0 | 0 | 1 | 0 | 0 | -1 |

FIG.34.

| -1 | 0 | 0 | -4 | 0 | 0 | -1 |
|---|---|---|---|---|---|---|
| 0 | 0 | 0 | 0 | 0 | 0 | 0 |
| 0 | 0 | 0 | 0 | 0 | 0 | 0 |
| 1 | 0 | 0 | 4 | 0 | 0 | 1 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG.35

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 1 | 0 | 0 | 4 | 0 | 0 | 1 |
| 0 | 0 | 0 | 0 | 0 | 0 | 0 |
| 0 | 0 | 0 | 0 | 0 | 0 | 0 |
| -1 | 0 | 0 | -4 | 0 | 0 | -1 |

IMAGE GRADIENT DETECTORS OPERATING IN A PARTITIONED LOW-PASS CHANNEL

This invention relates to electronic image processing systems using image dissection, for example, by solid state devices or by scanning and sampling.

Electronic image processing systems are known in which signals from a predetermined array of picture elements, or pels, are summed and averaged using electronic circuits so as to generate a signal or signals displaying selected components of the spatial fluctuations in image brightness. Appropriate weighting or multiplying factors are applied to the signals from the individual pels constituting the array in order to produce the desired response. One such known circuit generates a signal displaying mainly the large scale spatial fluctuations of the image brightness, the circuit acting as a low pass spatial filter. Another known circuit acts as a high pass spatial filter and generates a signal displaying mainly the small scale fluctuations that characterize the fine detail of the image. In practice, a set of filters having a high pass characteristic are utilized to generate signals corresponding to respective selected components of the spatial fluctuations in image brightness.

These filter circuits can be used at the same time on the signals from one array of pells, and if the combined weighting on each of the pels due to the low pass circuit and the set of circuits having the high pass characteristic is zero on all but one pel of the array, then these filters are complementary. Under this condition, addition of the output signals from the filters regenerates the input signal unchanged, except for any change in gain.

The two dimensional spatial frequency response of such complementary filters may be illustrated diagrammatically as performing a partitioning of the spatial frequency plane into two areas, a central area surrounding and including the zero frequency origin and representing the pass band of the low pass filter, and the area outside this central region and up to the band limit of the system representing the pass band of the high pass filter. The use of such complementary low pass and high pass spatial filters at the same time enables the high frequency components of the final scanned image to be selectively modified by amplification or attenuation for the purposes of image enhancement or noise suppression.

Electronic circuits performing the function of spatial filters as described have also been employed to detect the occurrence of predetermined image features. Each particular set of pel weightings, sometimes called a mask, is chosen to match a desired image feature. Thus a one pel, or point, feature detector on a 3×3 pel array can be formed by the set of pel weightings:

| | | |
|---|---|---|
| −1 | −1 | −1 |
| −1 | 8 | −1 |
| −1 | −1 | −1 |

This set of weightings, known in the prior art, can also be considered to form a high pass spatial filter. The complementary low pass filter would be formed by the set of weightings:

| | | |
|---|---|---|
| 1 | 1 | 1 |
| 1 | 1 | 1 |
| 1 | 1 | 1 | so that the two sets sum to form

| | | |
|---|---|---|
| 0 | 0 | 0 |
| 0 | 9 | 0 |
| 0 | 0 | 0 |

In this case all weightings should be divided by 9 to give unity overall gain.

Similarly, particular vertical and horizontal line detectors on a 3×3 pel array, known in the prior art, are formed respectively by the sets of weightings

| | | | | | | |
|---|---|---|---|---|---|---|
| −1 | 2 | −1 | | −1 | −1 | −1 |
| −1 | 2 | −1 | and | 2 | 2 | 2 |
| −1 | 2 | −1 | | −1 | −1 | −1 | which can also be considered to form high pass spatial filters. The use of spatial filtering techniques for feature detection thus involves summing the signals from an array of pels after weighting the signals in accordance with the characteristics of the feature required. If the absolute value of such a weighted sum exceeds a predetermined threshold, then the particular image feature associated with that set of weightings is assumed to have been detected.

Among the most important constituents of images are edges or brightness transitions. In order to detect such transitions, particular vertical and horizontal edge detectors on a 3×3 pel array, known in the prior art are formed respectively by the sets of weightings

| | | | | | | |
|---|---|---|---|---|---|---|
| −1 | 0 | 1 | | −1 | −1 | −1 |
| −1 | 0 | 1 | and | 0 | 0 | 0 |
| −1 | 0 | 1 | | 1 | 1 | 1 | which also can be considered to form horizontal and vertical gradient detectors, respectively. It will be noticed that both of these sets include pairs of next-adjacent (as distinct from adjacent) linear strings of pel weightings, that all the weightings in a string are of the same sign, that the weightings on the next-adjacent strings are of opposite sign, and that the weightings sum to zero. Summing the signal values from the corresponding pels after weighting in this way will, therefore, produce a signal characteristic of the firstdifference on next-adjacent pels taken in a horizontal or a vertical direction, respectively.

It is also possible to form a gradient detector with a pair of linear strings of pel weightings satisfying the foregoing requirements but with the two strings being adjacent to one another. In this case, summing the signal values after weighting in this way will produce a signal characteristic of the first difference on adjacent pels.

Following such detection at a particular image location, the image processing procedure applied at that location may be modified. For example, where the point feature detector referred to above is employed together with the complementary low pass filter, the high pass output signal from the detector might be added to the lowpass signal to form a regenerated signal when the detector output is greater in absolute magnitude than the predetermined threshold. This known technique has been described as signal coring with reference to its application in noise suppression systems.

Signal coring is most directly applied in image processing applications where the cored signal is provided by a set of high pass filters that is complementary to the low pass filter with which the set is associated. The regenerated signal thus formed from the combination of the cored high pass signal and the low pass signal substantially relates to but one pel of the array. If these filters are not complementary, some bands of frequencies may be omitted from the regenerated signal, or some bands of frequencies may be duplicated in the regenerated signal causing an undesirable increase in signal level within these duplicated bands. As a result, undesirable artifacts are developed in image locations corresponding to adjacent pels, e.g., forming unwanted lines or spots adjacent to the detected feature.

Appreciating that edges of most interest, both line detectors and edge detectors are responsive to the brightness transitions represented by edges. While either detector may therefore appear useful, each has its inherent limitations. A line detector provides inherently poorer signal-to-noise performance than an edge detector. However, the edge detector requires an arrangement of pel weightings that prevents substantial complementarity to the low pass filter with which it is associated.

While available edge and line detectors both possess undesirable attributes, they are nonetheless the conventional means for processing edge constituents of an image. In International Patent Application No. PCT/GB79/00159, Publication WO No. 80/00774 this problem was approached from the novel viewpoint that a high pass filter can be reconstituted by combining one or more pairs of gradient (or edge) feature detectors. This premise provides a solution to edge processing difficulties by utilizing the desirable attributes of each detector, namely, that a gradient (or edge) detector can provide a considerably better signal-to-noise performance for the detection of image edges or brightness transitions than can the high pass filter (e.g., a line detector) described above while the high pass filter can provide considerably better complementarity to a low pass filter than can the gradient (or edge) detector described above.

Thus in accordance with apparatus described in International Patent Application No. PCT/GB79/00159 Publication WO No. 80/00774 an electronic image processing system includes a high-pass electronic spatial filter comprising a pair of gradient detectors arranged back-to-back to detect a brightness transition such as an edge with their outputs cored independently before being combined to comprise the output of the reconstituted high-pass filter.

This enables brightness transitions, such as image edges perpendicular to the opposed directions of sensitivity of the pair of gradient detectors, to be detected with improved signal-to-noise performance without adding undesirable artifacts to the reconstituted high pass signal.

The pair of gradient detectors are arranged back-to-back so that they are sensitive to oppositely directed gradients, and have one of the component strings of pel weightings in common. They therefore respond to a scanned edge which is parallel to the linear strings of pel weightings making up the pair of gradient detectors. The pair of gradient detectors may be disposed to sense an edge which appears to extend horizontally, or vertically or diagonally in the image.

The high-pass filter may comprise more than one pair of gradient detectors. One pair may detect an edge extending in one direction, e.g. horizontally, while another pair, or pairs, may detect an edge, or edges, extending in a second, or further direction. Each gradient detector output will be cored independently.

Although there are clear advantages to be obtained by the use of a plurality of pairs of gradient detectors sensitive to different spatial directions, it should be appreciated that use may be made of more than one pair of gradient detectors which are sensitive in the same direction. This may be advantageous where the two or more pairs have different pass bands together making up the desired high-pass characteristic. If the pel strings for one such pair are adjacent then they will form a high-pass filter, while if they are next-adjacent or more widely spaced they will form a band pass filter.

The usefulness of pairs of gradient detectors still applies even if each of the two strings of a gradient detector includes only a single pel weighting.

An electronic image processing system may therefore include a network which cores each of a pair of first difference weighted signals from adjacent or from next adjacent pels of an array of at least three pels and then generates second difference signals from the cored first difference signals to provide an appropriate image feature enchancing signal with improve signal-to-noise ratio.

The principles set out in the preceding paragraphs may be used in conjunction with signals from 3×3 or 5×5 arrays and rectangular arrays such as 1×3, 1×5, or 3×5 and may also be modified for use with arrays of hexagonal or other shape.

A set of filters as described above and which taken together have a high pass characteristic cause the generation of signals corresponding to respective selected smaller scale components of spatial fluctuations in image brightness while a filter displaying a low pass characteristic generates a signal corresponding to large scale spatial fluctuations of the image brightness. The set of filters which taken together have a high pass characteristic may be described as operating in a high pass channel defined by a group of subchannels; each subchannel filter generates a signal by convolving the image data with a weighting pattern corresponding to a selected spatial fluctuation within the overall high pass channel. The low pass filter may be described as operating in a low pass channel and is generated by convolving the image data with an appropriate low pass weighting pattern.

Each of the high pass subchannels generally transmits a noise signal component and, if present, a selected structural feature signal component of the image. By separately thresholding each subchannel the noise component can be substantially removed, allowing the larger amplitude structural feature signals to be transmitted. These signals are then first summed together and further summed to the signal transmitted by the low pass channel so as to regenerate an enhanced version of the original image. In general, the noise suppression performance of such a combination of filters would be expected to improve as the size of the array on which the weighting patterns are generated is increased. For example, in noise-only image areas, all of the high pass subchannel signals may be below threshold while only the low pass channel—which is not thresholded—will contribute noise to the output image signal. Since, in the general case, noise power is uniformly distributed across the band of image frequencies while image power rapidly increases toward lower frequencies, the larger the low pass weighting array, and therefore the narrower the pass band of the low pass channel, the greater will be the signal-to-noise ratio of this channel.

While the advantages of a narrow band low pass channel are reconizable, the difficulties of implementing such an approach discourage its use. For instance, as the size of the low pass array increases, the requirement of channel complementarity becomes proportionately more complex to achieve in practice, in particular when the large low pass array is used with a multiplicity of band pass arrays matched to selected structural features that together must make up the complementary high pass band. In order that the total weighting on each of the pels from both channels sums to zero on all but one pel of the array, it is necessary to use at least one large array in the high pass channel as well.

On the other hand some of the band pass arrays must be small so as to select those small structural features that are significant in image areas of small detail. It is not obvious how these requirements may be reconciled without substantial complexity and cost both in design and implementation.

In U.K. Application No. 8012513, an amended copy of which is filed concurrently with the present application, a solution to these related problems of channel complementarity and circuit complexity is provided by prefiltering the sampled image data and then subsampling the pre-filtered image data according to a sparse sampling pattern. Apparatus in accordance with U.K. Application No. 8012513, includes a signal processing network for partitioning the image spatial frequencies into a high pass channel further divided into feature detecting subchannels, and a pair of prefiltered and subsamples subsampled channels including (1) a first narrow band low pass channel, and (2) a first band pass channel whose pass band in 2-dimensional spatial frequency space is approximately circularly symmetric with the pass band of the high pass channel and is further divided into feature detecting subchannels, the sum of the pair of subsidiary channels forming a principal broad band low pass channel that complements the high pass channel. By coring the subchannel signals comprising the first band-pass channel before they are summed with the first narrow band low pass channel, a low-noise, feature-enhanced signal is obtained in the principle low pass channel for summing with the cored output signals from the high pass subchannels.

The principle embodied in U.K. Application No. 8012513, may be further extended by replacing the first narrow band low pass channel with a second summed pair of prefiltered and sub-sampled subsidiary channels including (1) a second narrower band low pass channel and (2) a second band pass channel whose pass band in 2-dimensional spatial frequency space is approximately circularly symmetric with the pass bands of the first band pass channel and the high pass channel and is further sub divided into feature detecting subchannels. In like manner, the second narrower band low pass channel may be further replaced by a third summed pair of prefiltered and subsampled subsidiary channels, and so on.

The set of subchannel signals comprising the first band pass channel are formed by convolving a first low pass filter pattern (which is complementary to the high pass channel) with a set of weighting patterns chosen so as to detect the presence of selected structural feature components of images. The patterns in this set take the form of sparse matrices, in that most of their elements are zero, while the nonzero elements are regularly spaced on an interval that is directly related to the size of the first low pass pattern. By this form of processing, the image array is effectively low pass prefiltered by convolution with the first low pass pattern and then regularly subsampled at an appropriate rate in accordance with the non-zero spacing of the sparse matrices.

In a similar manner, the signal comprising the first narrow band low pass channel is formed in a process of low pass prefiltering and regular subsampling by convolving the image array with the first low pass filter pattern and by reconvolving the result with a low pass weighting pattern in the form of a sparse matrix having non-zero elements that are regularly spaced on an interval that is directly related to the size of the first low pass pattern. In summing the signals in the first narrow band low pass channel and the cored output signals from the band pass subchannels, a low-noise, feature-enhanced signal is obtained in the principal low pass channel having the desired complementarity with the signal in the high pass channel.

In extending these principles to further partition the low pass channel, the network forming the first narrow band low pass channel is replaced by a network generating a second summed pair of prefiltered and subsampled subsidiary channels including a second narrower band low pass channel together with a second set of subchannels in a second band pass channel. By coring the output signals from these secondary subchannels before summing with the secondary low pass channel, a further noise-reduced and feature-enhanced signal is obtained for summing with the output signals from the first band pass channel and the high pass channel. The still further partitioning of the secondary narrower band low pass channel, and yet narrower channels formed as a result, may be carried as far as deemed desirable.

At each level of subsampling, (i.e., the first band pass and low pass channels defined by the first level of sparse matrices, the second band pass and low pass channels defined by the second level of sparse matrices and having their pass bands at lower spatial frequencies etc.), the weightings on each of the elements of the set of sparse matrices defining the subsampling patterns of the band pass and low pass channels at a given level sum to zero on all elements of the subsampled image array but the central element. Because these sparse matrices are at each level convolved with the image array prefiltered by the low pass pattern of next higher bandwidth, this central element generates a signal that is complementary to the signal in the corresponding band pass channel of next higher bandwidth.

In accordance with a specific embodiment of the present invention, each set of subsampled subchannels forming the band pass channel at each level include signals provided by an electronic band pass spatial filter comprising a pair of gradient detectors arranged back-to-back in accordance with International Patent Application No. PCT/GB79/00159 to detect brightness transitions corresponding to selected image features. Each filter pattern based on a sparse matrix is replaced by a pair of back-to-back gradient detectors also taking the form of sparse matrices. The output signals of each gradient detector are independently cored before being combined to comprise the output of the reconstituted subsampled band pass filter. The output of the band pass channel is then added to the signal provided by the respective narrow band low pass channel to provide a low-noise, feature enhanced low pass signal.

Although it is preferred that the high pass filter, formed by the sum of the gradient-detecting filters, and the low pass filter, formed by the sum of the prefiltered and subsampled gradient detecting band pass filters and narrow band low pass filters, are complementary in that the combined weightings of these filters on corresponding pels sum to zero on all pels except the central pel, it may be found that useful improvements in signal to noise ratio are still obtainable where relatively small residual weightings remain on some pels, particularly on the outer pels, of the array after the weightings have been combined. The filters may then be said to be substantially complementary.

Similarly, although at each level of subsampling it is preferred that the band pass and the low pass channels defined by the sparse matrices are complementary with respect to that level of subsampling, it may be found that useful improvements in signal-to-noise ratio are still obtainable where relatively small residual weightings remain on some pels other than the central pel after their combination. The channels may then be said to be substantially complementary.

The invention will now be described in more detail with reference to the accompanying drawings in which:

FIG. 2 shows the output waveform caused by scanning the filter of FIG. 1 over an edge image 10;

Figure 3:
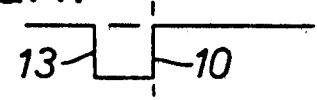
FIGS. 3 and 5 show individually known gradient or edge-feature, detectors.
Figure 5:
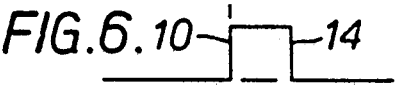
Figures 14, 15, 16, 17:
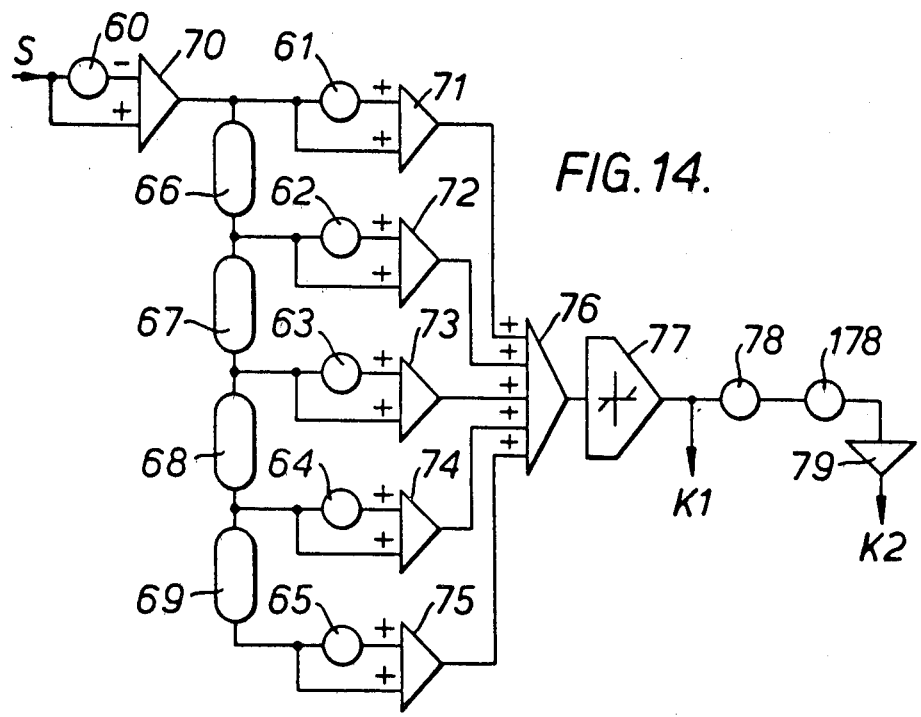
Figures 18, 19, 20:
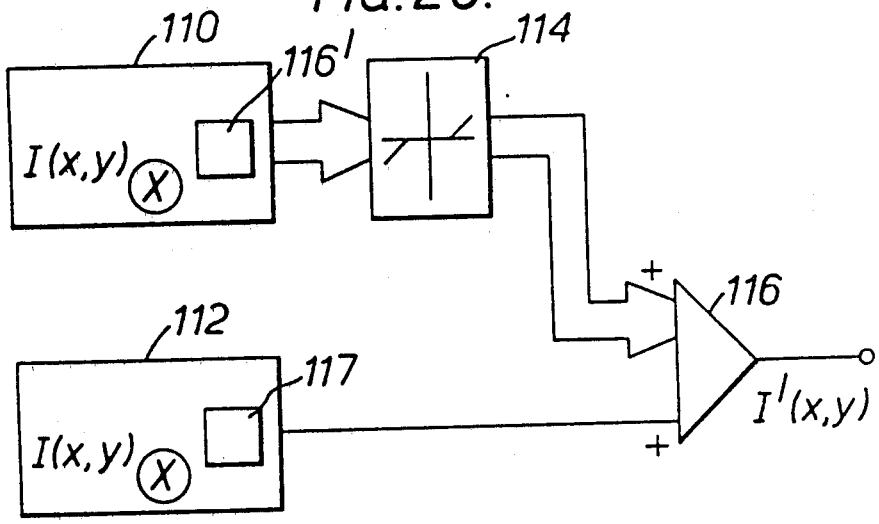
Figure 21:
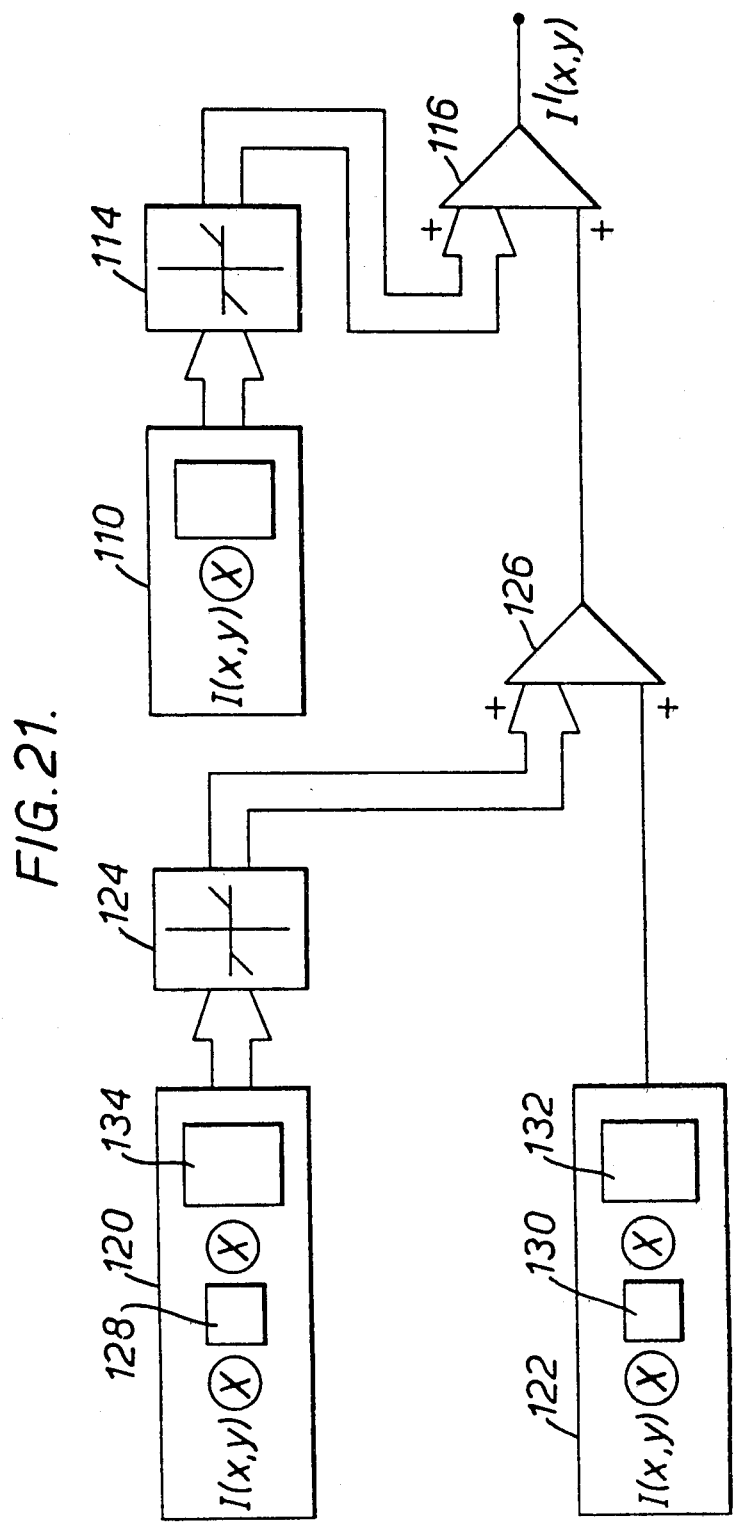
Figure 25:
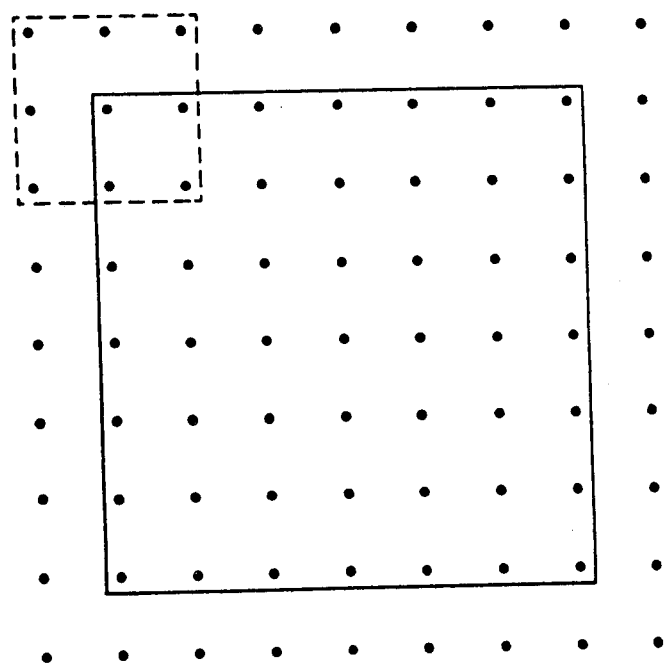
Figure 28:
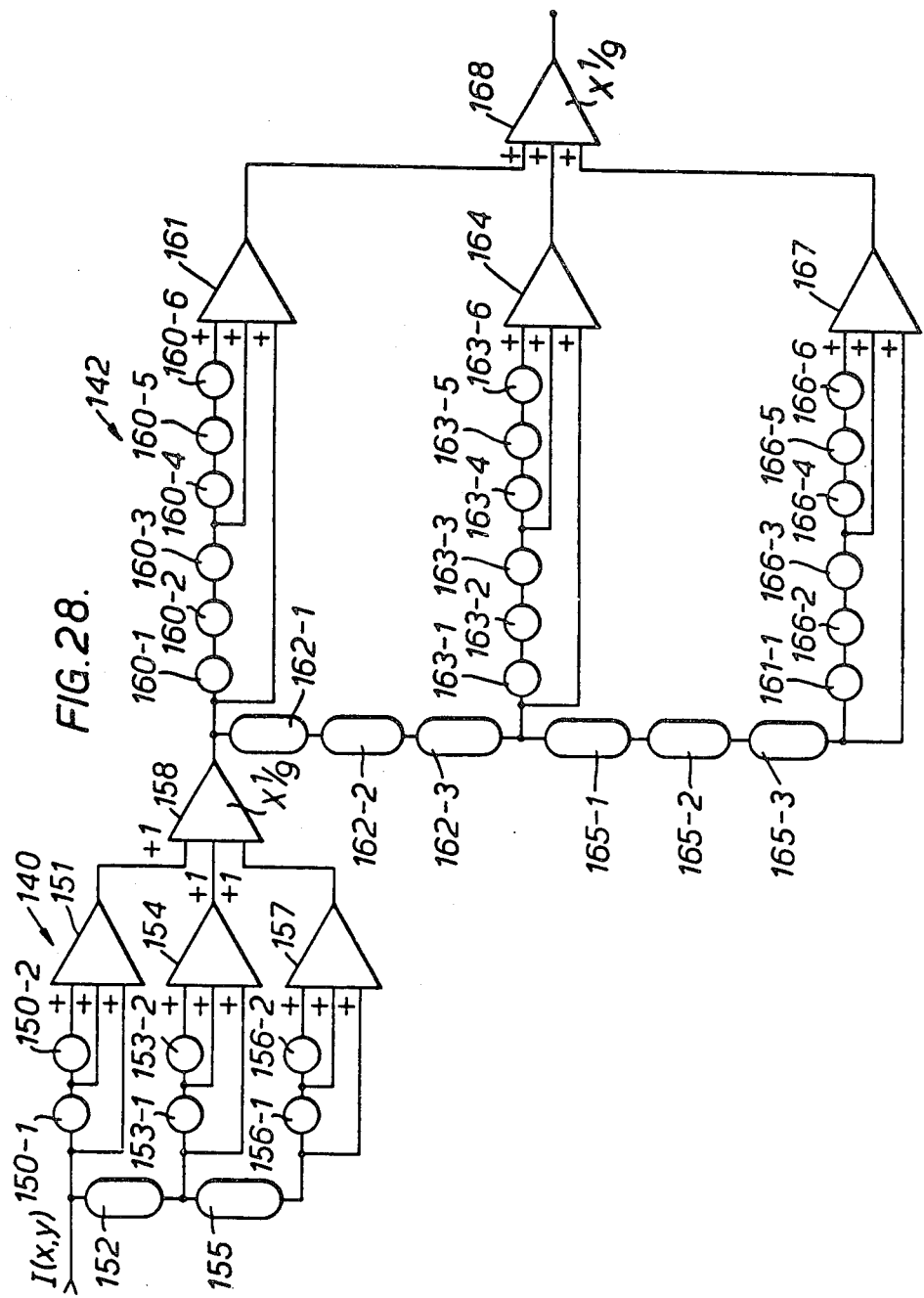
Figure 29:
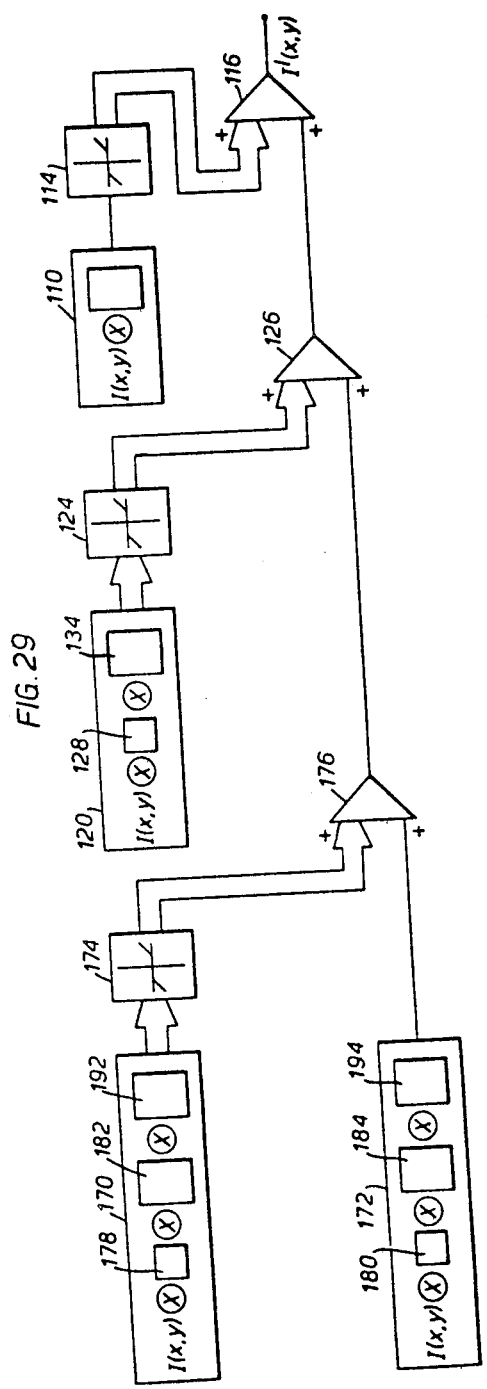
Figure 30:
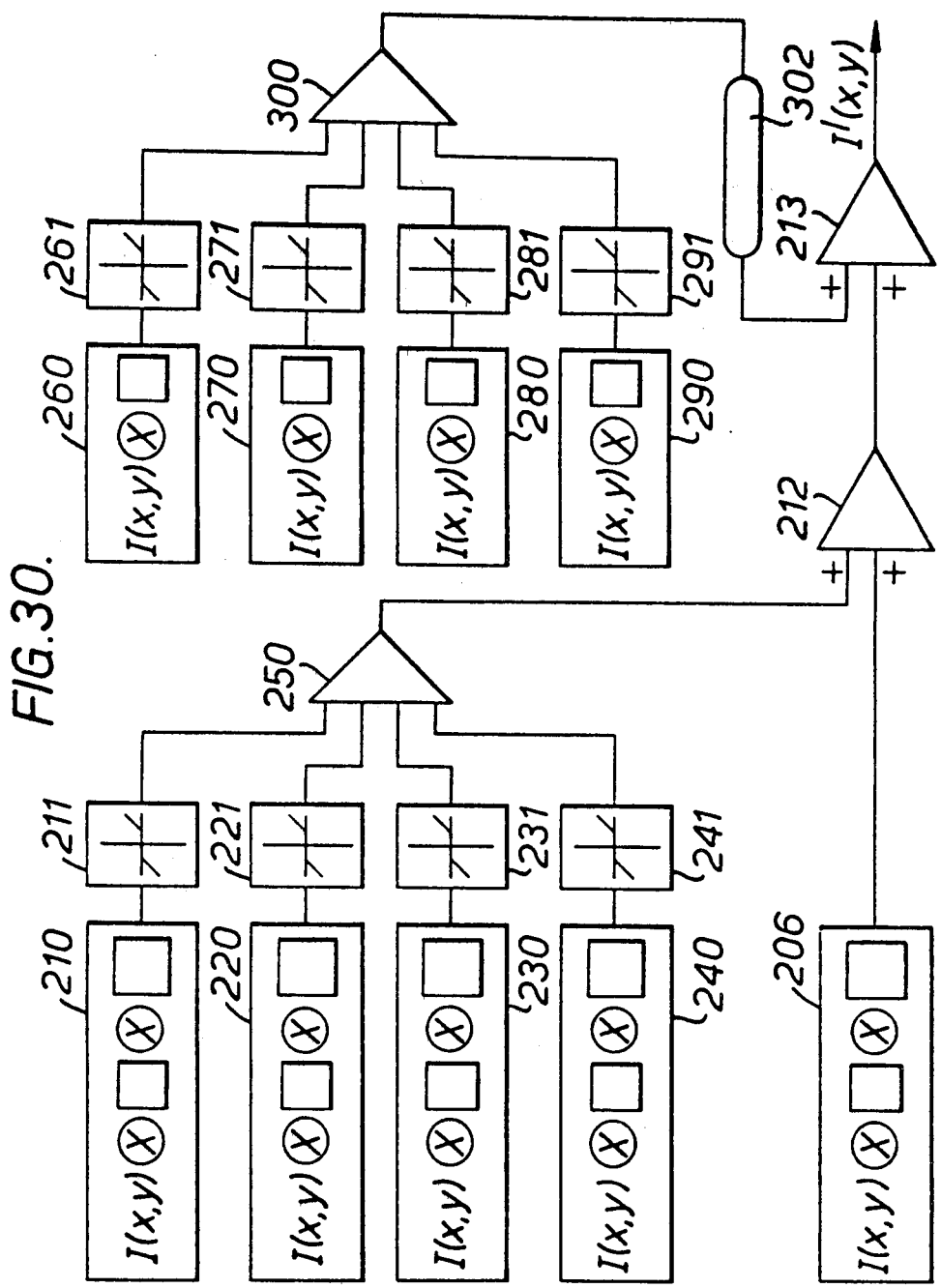
Figure 36:
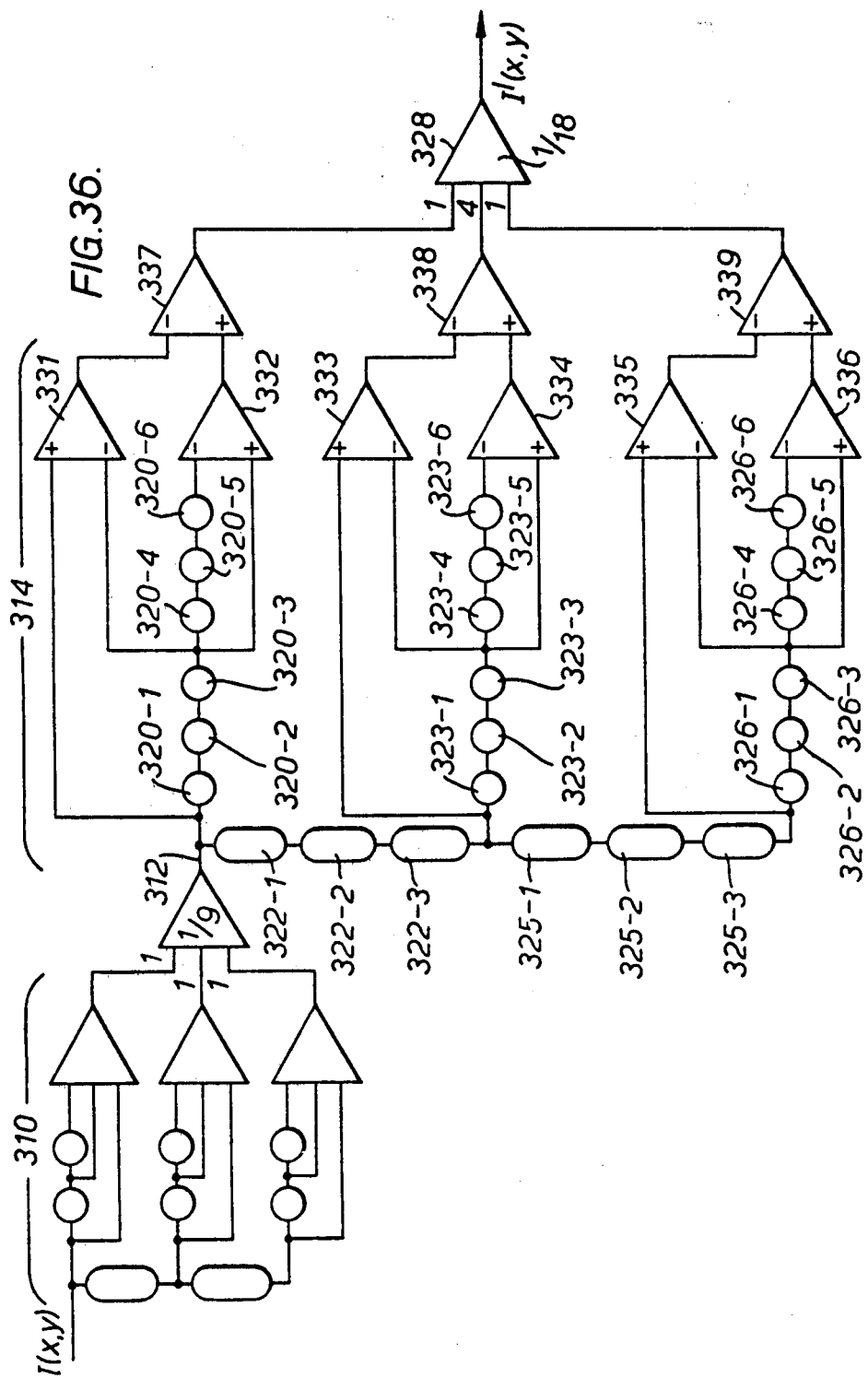
Figure 37:
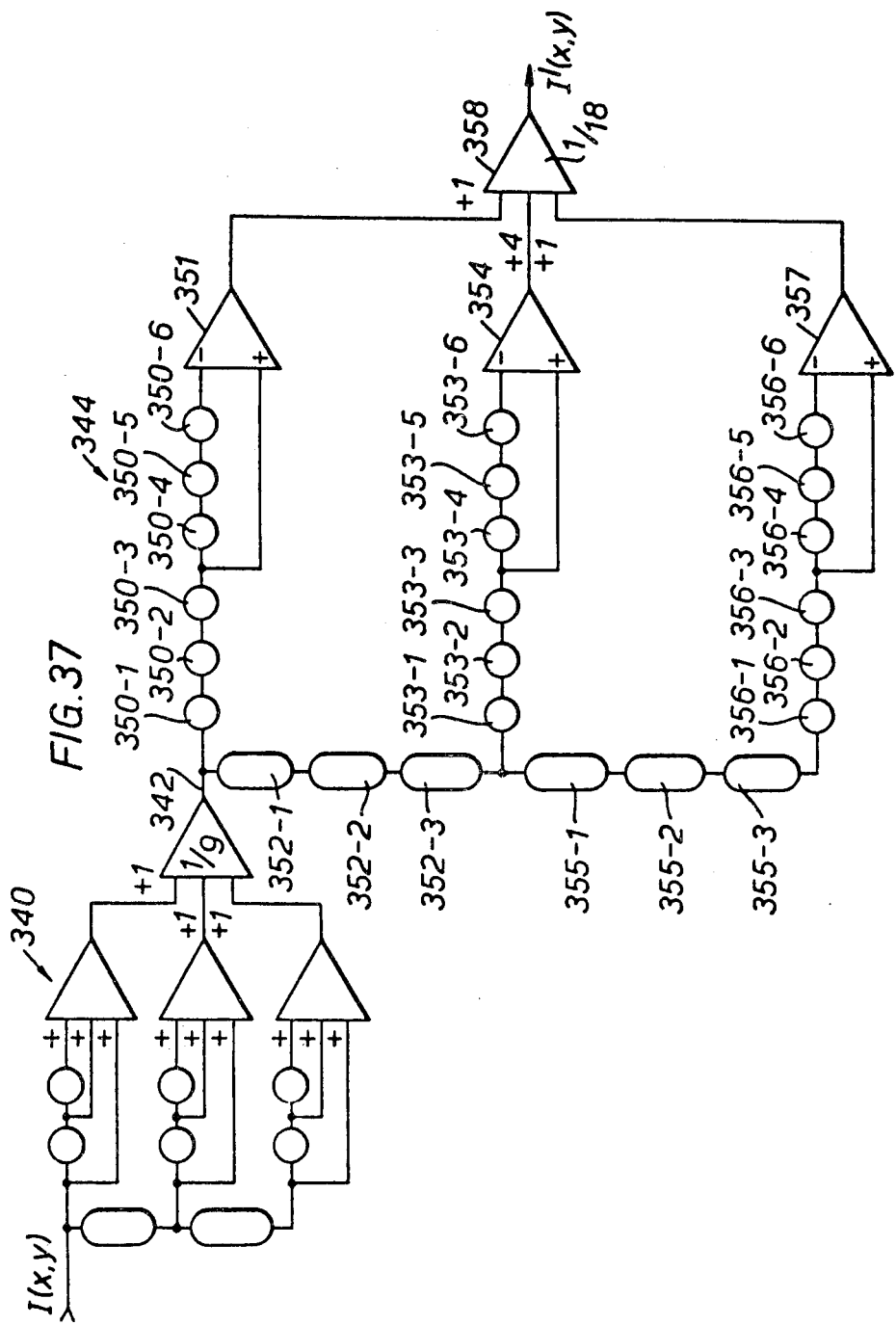

FIGS. 4 and 6 respectively show the output waveforms caused by scanning the detectors of FIGS. 3 and 5 over the edge image 10;

FIG. 7 is a network constituting one of a pair of horizontal gradient detectors which are spaced one pel apart;

FIG. 8 shows an alternative network to FIG. 7, a single element delay unit being used in the gradient detector to derive difference signals between adjacent pels, and also shows means for deriving the output of the paired horizontal gradient detector;

FIG. 9 shows a high pass spatial filter, and FIG. 10 shows a pair, E and F, of horizontal gradient detectors derived therefrom;

FIG. 11 shows a band pass spatial filter, and FIG. 12 shows a pair, G and H, of horizontal gradient detectors derived therefrom;

FIG. 13 shows another network, using the principle of the network of FIG. 7, but applied to next-adjacent pels, for providing spatial filtration using the pair of gradient detectors G and H of FIG. 12;

FIG. 14 shows another network, using the principle of the network of FIG. 8 but applied to next-adjacent pels, for providing spatial filtration using the pair of gradient detectors G and H of FIG. 12;

FIG. 15 shows a band pass diagonal line detector for a 5×5 array, and FIG. 16 shows a pair, L and M, of diagonal gradient detectors derived therefrom;

FIG. 17 shows a pair, N and P, of diagonal gradient detectors for a 3×3 array;

FIG. 18 shows a high pass spatial filter based on single pel weightings, and FIG. 19 shows a pair of gradient detectors Q and R derived therefrom;

FIG. 20 is a schematic diagram of an image processing system in accordance with the preceding Figures;

FIG. 21 is a schematic diagram of an image processing system incorporating a partitioned low pass channel;

FIG. 22 shows a known low pass spatial filter;

FIG. 23 shows a low pass filter comprised of a sparse matrix;

FIG. 24 shows a 9×9 low pass pel array formed by convolving the arrays of FIG. 22 and FIG. 23;

FIG. 25 is a diagram useful in describing apparatus for prefiltering and subsampling image data;

FIGS. 26 and 27 show high pass spatial filters or vertical and horizontal line detectors formed of sparse pel arrays;

FIG. 28 is a network constituting the convolution of the low pass filter of FIG. 22 with the sparse filter of FIG. 23;

FIG. 29 is a schematic diagram of a further extension of the image processing system described in FIG. 21;

FIG. 30 is a schematic diagram of a presently preferred embodiment of a network in accordance with the invention;

FIG. 31 shows paired horizontal and vertical gradient detectors;

FIGS. 32, 33, 34 and 35 show paired vertical and horizontal gradient detectors based on a sparse matrix in accordance with the invention;

FIG. 36 shows a network for providing a convolution of a low pass filter with a gradient detector based on a sparse matrix; and FIG. 37 shows a network for providing a convolution of a low pass filter with a vertical line detector based on a sparse matrix.

Before considering the invention in more detail attention is invited to FIGS. 1–19 of the accompanying drawings where relevant portions of International Patent Application No. PCT/GB79/00159 are illustrated.

The following discussion with respect to FIGS. 1–19 is believed useful in understanding a preferred mode of practicing the present invention. Beginning with FIG. 1, a high pass filter or line detector for a 3×3 pel array is shown. As this filter is scanned over an edge image 10 there is generated an output, shown in FIG. 2, consisting of a negative pulse 11 immediately followed by a positive pulse 12.

Figure 1:
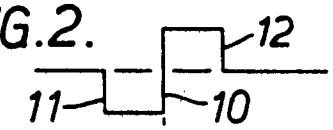
FIG. 1 shows a known high pass spatial filter or line detector.

However the high pass filter or line detector of FIG. 1 may be separated into two back-to-back gradient, or edge-feature, detectors spaced one pel apart as shown respectively in FIGS. 3 and 5. Their respective individual outputs on being scanned over the same edge image 10 are the spaced negative pulse 13 and positive pulse 14, seen respectively in FIGS. 4 and 6.

It will be noted that the negative pulse 13 is in the same spatial location in relation to the edge 10 as the negative pulse 11, and similarly with the positive pulses 14 and 12. The outputs of the two gradient detectors of FIGS. 3 and 5 therefore do not overlap for the same edge, and they can be thresholded or cored independently. As the noise level of their outputs is lower by a factor of $$\frac{1}{\sqrt{3}},$$

for a white gaussian noise input, then that of the line-feature detector of FIG. 1, the threshold or coring level used in the subsequent signal processing can either by reduced, leading to better signal transmission, or, with the same threshold level, better noise rejection can be achieved. Thus there are advantages in substituting the pair of gradient detecting spatial filters of FIGS. 3 and 5, spaced one pel apart, for the high pass filter of FIG. 1.

A single horizontal gradient detector constituting one of this pair of filters is shown in the network of FIG. 7. Here the incoming video signal S from an image scanning system is applied to a 1 element delay 20, to a differencer 21, and to a 1 line delay 22. The 1 element delayed signal is also applied to the differencer 21 and the result is applied, together with the corresponding results for the two pels of the next two lines (by way of 1 element delay 23, differencer 24, and by way of 1 line delay 25, 1 element delay 26, and differencer 27) to the summer 28. The sum, representing the output of the gradient detector of FIG. 5 for example, is applied to the amplifier 29 which performs the thresholding operation to produce the cored signal C1. A second similar network, not shown, may be used to produce a cored output C2, not shown, for the other horizontal gradient detector of the pair, or, more economically this output may be produced by delaying signal C1 with a one element delay, not shown, and inverting it with an inverter, not shown in this particular Figure. The two cored signals C1 and C2 are then summed to provide an output which will be suitable for enhancing the image of the vertical edge 10.

As an alternative, the first difference signals may be obtained prior to the use of the line delay units. FIG. 8 shows another horizontal gradient detector in which the first difference signals between adjacent pels are obtained prior to the line delay units. Here the input signal S is applied only to the 1 element delay 30 and the differencer 31. The 1 element delayed output is also applied to the differencer 31, and the resulting difference between one pel and the adjacent pel is applied to the summer 32 and also to the 1 line delay 33 and thence to the 1 line delay 34, the outputs of these line delays also being applied to the summer 32. Amplifier 35 receives the output of summer 32 to produce thresholded output signal D1. As before, another network, not shown, may be used to supply the cored output D2 of the other horizontal gradient detector of this pair, or this may be derived more economically as shown by delaying signal D1 with a one element delay 36 and inverting it in inverter 37. The two cored signals D1 and D2 are then summed to provide an output which will be suitable for enhancing the image of the vertical edge 10.

For a vertical gradient detector, the networks shown could be used after interchanging the line and element delay units. Again, the cored outputs of the pair of gradient detectors are summed to provide an output which will be suitable for enhancing the image of a horizontal edge.

The above examples use pel weightings of +1 and −1 but the weightings used need not be either equal or unity. Thus from the high pass filter of FIG. 9 there may be formed a pair of gradient detectors E and F of FIG. 10. The necessary signals for horizontal gradient detection may be obtained using the networks of FIG. 7 or FIG. 8, with the addition of the appropriate weighting factors shown in FIG. 10. The cored outputs of the two gradient detectors E and F are summed to provide an output which is enhanced where a vertical line or edge is scanned.

It should be noted that the pattern of weightings of the high pass filter of FIG. 9, in addition to forming the pair of gradient detectors E and F, can be rotated through 90° to form an additional filter. In this form it can be used to generate a second pair of gradient detectors sensitive to gradients at right angles to those sensed by the pair E and F shown in FIG. 10. Use of this second pair additionally will provide enhancement of horizontal image edges in addition to the enhancement of vertical image edges provided by the first pair.

The combined output from these two pairs of gradient detectors make up the output of the high pass filter, and is added, possibly after amplification or attenuation, to the output of the complementary low pass filter

| 1 | 1 | 1 |
| 1 | 1 | 1 |
| 1 | 1 | 1 | to form the enhanced video signal.

The examples so far described have used adjacent strings of pel weightings but this is not a necessary restriction. In FIG. 11 is shown a band pass filter, this time for a 5×5 pel array, which uses next-adjacent strings. This can be replaced by the pair of gradient detectors G and H of FIG. 12, which also have next-adjacent strings of pel weightings with one string in common and whose outputs, after coring, together give an advantage in signal to noise ratio. The required signals can be generated by networks of the types shown in FIGS. 7 and 8 if each of the single element delay units there shown is replaced by a pair of such units. Alternatively the required signals J1 and J2 from one such pair of gradient detectors may be generated by a network similar to that shown in FIG. 13. Here single delay units are used but the outputs of adjacent pairs of pels are summed. This arrangement uses the principle of FIG. 7 but derives both output signals as shown. FIG. 13 shows element delay units 40, 41, 42, 43, 44, 45, 58 and 59; line delay units 46, 47, 48 and 49; differencers 39, 50, 51, 52 and 53; summers 55 and 56; thresholding amplifier 57; inverter 54; the incoming signal is S and the output of one detector is J1 while that of the other detector of the complementary pair is J2.

Because they comprise a band pass filter the pair of filters G and H together with their rotated versions do not form a complete set with respect to a complementary low pass filter, in the sense that the pair of filters E and F does with the rotated version referred to above with reference to FIG. 9. Other filters must be used in addition to make up such a complete set with a high pass characteristic, although in practice it may be desirable to omit some of the component filters.

Yet another alternative network is shown in FIG. 14, corresponding to FIG. 8. Here a differencer 70 is connected to the first element delay unit 60 and summers 71, 72, 73, 74 and 75 replace the differencers 39, 50, 51, 52 and 53 of FIG. 13. In other respects these arrangements are the same, the other element delay units being identified at 61, 62, 63, 64, 65, 78 and 178, the line delay units at 66, 67, 68 and 69, the thresholding amplifier 77 receiving the output of summer 76, and an inverter 79. The pair of cored outputs of the high pass filter are K1 and K2.

The described gradient detectors have been horizontal, or, in some cases, vertical detectors. The same principle can be applied to diagonal gradient detectors. In FIG. 15 is shown a band pass diagonal line detector for a 5×5 pel array. This can be replaced by a pair of filters L and M of FIG. 16.

FIG. 17 shows a pair of diagonal gradient detecting filters N and P for a 3×3 array. The high pass filter from which they were derived is not shown. It will be appreciated that the pairs of diagonal filters of FIGS. 16 and 17 require networks similar in principle to FIGS. 7, 8, 13 or 14 but with the delay units and other circuit components re-arranged to select the signals from the appropriate picture elements.

The above embodiments of at least one pair of gradient detectors replacing a single high pass filter will normally be used in conjunction with the complementary or substantially complementary, low pass filter.

The described gradient detectors have been described in connection with weighting arrays wherein each of the two strings of a gradient detector array involve multiple pel weights, see, for example, FIGS. 3, 5, 10 and 12 (horizontally sensitive weights) or FIGS. 16 and 17 (diagonally sensitive weights). However the advantages obtained from the principle of back-to-back gradient detectors still applies if the two strings include only a single pel weighting. As an example, FIG. 18 shows a vertical line detector for a 3×3 pel array based on single pel strings. This filter can be replaced by the pair of single pel string filters sensitive to horizontal gradients of FIG. 19. If desired, the principle can be similarly applied to horizontal and to diagonal line sensitive filters and to corresponding bandpass filters using single pel strings.

In considering the preceding paragraphs in more detail, attention is invited to FIG. 20 of the accompanying drawings wherein a schematic illustration is shown of apparatus for enhancing an image signal (x, y). The filters 112 and 110 respectively generate signals in a principal low pass channel and in a set of subchannels in a principal high pass channel such that the resultant signals in the principal channels are complementary and regenerate an enhanced image signal I' (x, y). The principal high pass channel comprises at least one set of detail subchannels forming a signal having a high pass characteristic. The signals in the detail subchannels are separately cored, as shown schematically by the set of coring amplifiers 114, and summed in the summing amplifier 116 with the signals in the low pass subchannel to form the reconstituted image signal I' (x, y).

A signal is generated in each detail subchannel by convolving a two-dimensional image signal I(x, y) with respective weighting spatial filter arrays 116', e.g., back-to-back arrays E and F of FIG. 10 together with similar arrays oriented in the horizontal direction. While the pel array patterns may be of any selected size it is to be particularly noted that the size of a pel array 117 in the low pass channel is desirably independent of the pel array sizes in the high pass channel. Such independence allows for example a 9×9 array to be used in the low pass filter 112 for obtaining a relatively better signal-to-noise ratio than from a smaller (e.g. 3×3) pel array.

However, the use of a large pel array in the low pass channel together with smaller high pass pel arrays ordinarily means that the resultant signals in the principal channels are not complementary, i.e., the signal I'(x, y) includes spurious signal contributions on pels other than the central pel.

In further considering the apparatus disclosed in U.K. patent application No. 8,012,513, attention is now invited to FIG. 21 in which the principal low pass channel of FIG. 20, also referred to herein as the broad band low pass channel, is replaced by a first bandpass channel further divided into feature detecting subchannels and a first narrowband low pass channel as constituted by the first bandpass filter 120 and the first narrowband low pass filter 122, respectively. The bandpass detail subchannel signals are separately cored in a set of coring amplifiers 124 and summed together with the signal in the narrowband low pass channel in a summing amplifier 126. The output signal from the summing amplifier 126 forms the principal low pass channel which, as before in the case of FIG. 20, is then combined with the signal having a high pass characteristic to form the reconstituted image signal I' (x, y).

The apparatus schematically shown by FIG. 21, and as to be further described herein, effectuates a prefiltering of the sampled image I followed by a subsampling of the prefiltered image signal in accordance with a sparse sampling pattern. In a specific embodiment of the apparatus described in U.K. patent application No. 8,012,513, the prefiltering of the sampled image signal I is performed by convolving the image data with first low pass filter arrays 128, 130 in each of the narrow band low pass and bandpass channels. An exemplary set of pel weights for the arrays 128, 130 is shown by FIG. 22 where it may also be observed that the low pass pattern is itself complementary to the high pass signal formed by the set of high pass filters 110.

The signal comprising the first narrow band low pass channel is formed by convolving the sampled image data I(x, y) with the low pass filter pattern 130 (FIG. 22). The prefiltered signal from filter 130 is then reconvolved over a larger array 132 having a set of pel weightings chosen so as to pass low frequency components of the image. The pel pattern in the array 132 takes the form of a sparse matrix as shown in FIG. 23, in that most of the elements are zero, while the non-zero elements are regularly spaced on an interval that is directly related to the size of the first low pass pattern.

In considering the prefiltering and subsampling aspect in more detail it is noted that the narrow band low pass signal is obtained by initially convolving the image signal with the 3×3 pel array shown in FIG. 22. The resulting signal of this initial convolution is then reconvolved with the 7×7 pel array shown in FIG. 23 to provide the effective filter output of the 9×9 pel array shown in FIG. 24, but without having to incorporate the circuit complexity normally required by a large array replete with non-zero elements. By way of explanation, and with reference to FIG. 25, the initial convolution of the image signal with the 3×3 pel array (FIG. 22) causes the substitution of a nine-pel average signal for each pel in the latter 7×7 pel array (FIG. 23). In other words, the 3×3 pel array depicted within broken line in FIG. 25 makes available its summed signal at the position of its central pel as it is positioned step-by-step over each pel in the 7×7 pel array depicted within the solid outline. Then the narrow band low pass signal is generated by summing the nine of these scanned signals corresponding to the non-zero elements of the sparse 7×7 matrix of FIG. 23. This procedure ensures that every pel of the 9×9 array of FIG. 25 contributes to this low pass signal as required.

The signal comprising the first bandpass channel is formed by convolving the sampled image data I(x, y) with the low pass filter pattern 128. The prefiltered signal from filter 128 is then reconvolved over a group of large arrays 134 having a set of pel weightings chosen so as to detect the presence of selected structural feature components of images. The pel patterns of the arrays 134 take the form of sparse matrices, in that most of the elements are zero, while the non-zero elements are regularly spaced on an interval that is directly related to the size of the first low pass pattern. In accordance with U.K. patent application No. 8,012,513, the sparse pel weightings of these matrices are selected so as to match desired fluctuations in image brightness of the subsampled signal from the prefiltering part of the apparatus. FIGS. 26 and 27 illustrate sparse arrays matched to vertical and horizontal lines, respectively, which form two of the feature detecting subchannels of the bandpass filter 120 (FIG. 21). Other sparse arrays (not shown) may be included to detect other orientations, e.g., left and right diagonal, of spatial fluctuations in image brightness. The signal in each feature detecting subchannel is independently cored and then summed with the signal in the narrowband low pass channel generated by the filter 122. The output from the summer 126 is a broad-band, low-noise, feature-enhanced signal in the principal low pass channel that is complementary to the signal in the principal high pass channel.

A low pass filter constituting the convolution of the 3×3 pel array (FIG. 22) and the 7×7 pel array (FIG. 23) is shown in the network of FIG. 28. The incoming video image signal I(x, y) is initially convolved with the 3×3 spatial filter constituted by the network 140 and the resultant signal is then reconvolved with the 7×7 spatial filter constituted by the network 142. For the first convolution, the image signal I (x, y) is applied to two 1-element delays 150-1 and 150-2, to a summer 151, and to a 1 line delay 152. The 1 and 2 element delayed signals are also applied to the summer 151 and the result is applied, together with the corresponding results for the three pels of the next two lines (by way of 1 element delays 153-1 and 153-2, summer 154, and by way of 1 line delay 155, 1 element delays 156-1 and 156-2, and summer 157) to the normalizing summer 158. The sum, representing the output of the low pass filter of FIG. 22, for example, is normalized (by multiplication by 1/9) and then applied to the network 142. For the second convolution, the low pass image signal from the summer 158 is applied sequentially to 1 element delays 160-1 through 160-6, to a summer 161, and sequentially to three 1 line delays 162-1, 162-2 and 162-3. The three and six element delayed signals are also applied to the summer 161 and the result is applied, together with the corresponding results for the fourth and seventh pels of the fourth and seventh lines (by way of 1 element delays 163-1 to 163-6, summer 164, and by way of 1 line delays 165-1 to 165-3, 1 element delays 166-1 through 166-6 and summer 167) to the summer 168. The sum, representing the output of the convolution of the low pass filters of FIGS. 22 and 23, for example becomes the output of the narrow band low pass filter 122 of FIG. 21 and is itself summed with the signals in the bandpass feature detecting subchannels to form the principal low pass channel. The feature detecting signals from the filters 120 in the bandpass subchannels of FIG. 21 are similarly obtained by convolving the video image signal I (x, y) with a low pass filter constituted by the network 140 of FIG. 28, and then reconvolving the resulting image signal with a selected feature detector arranged on a 7×7 pel array similar to the network 142 of FIG. 28 but with the summation rearranged to correspond to the selected features, as shown by way of example in FIG. 36 for the vertical line feature detector shown in FIG. 26.

A vertical line detector constituting the 3×3 pel array of FIG. 22 convolved with the 7×7 pel array of FIG. 26 is shown in the network of FIG. 36. The incoming video image signal is applied to the network 310 for producing a low pass signal on line 312 corresponding to the pel weighting of FIG. 22. Network 310 has been describe previously in connection with network 140 of FIG. 28. The lowpass signal on line 312 is applied sequentially to two 1-element delays 320-1 to 320-6 and to 1-element delays 322-1, 322-2 and 322-3.

The undelayed and the three element delayed signals are applied to a differencer 331 and the result is applied, together with the three and six element delayed signal difference via differencer 332, to differencer 337. This second difference is applied to normalizing summer 328 together with similar second differences from the fourth and seventh lines (by way of 1-line delays 322-1 through 322-3, 1-element delays 323-1 through 323-6 and differencers 333, 334 and 338, and by way of 1-line delays 325-1 through 325-3, 1-element delays 326-1 through 326-6, and differencers 335, 336 and 339) to the weighted summer 328. The sum, representing the output of one feature detecting subchannel of 120 in FIG. 21 is applied to one of the set of coring amplifiers 124 and added in summer 126 to the low pass signal generated by a network such as that described by FIG. 28 and represented schematically as 122

In extending the principle of the invention to further partition the low pass region of the channel, the network forming the first narrow band low pass channel (as represented by the circuit of FIG. 28) is replaced by a network generating a second summed pair of prefiltered and subsampled subsidiary channels including a second narrower band low pass channel together with a second set of subchannels in a second bandpass channel. FIG. 29 illustrates such as extension in which the first narrowband low pass channel of FIG. 21, is replaced by a second bandpass channel further divided into feature detecting subchannels and a second narrower band low pass channel, each constituted by a second bandpass filter 170 and a second narrowband low pass filter 172, respectively. The second set of feature detecting subchannel signals—representative of selected spatial brightness fluctuations—are separately cored in a set of coring amplifiers 174 and summed in a summing amplifier 176 with the signal in the second narrow band low pass channel. The output signal from the summing amplifier 176 forms the first narrow band low pass channel (as in FIG. 21) which is then processed in accordance with the description relative to FIG. 21 to form the reconstituted image signal I' (x, y).

Referring again to FIG. 29, it will now be apparent that the second narrowband low pass channel constituted by the filter 172 may be further partitioned into third bandpass and narrow band low pass channels, and so on until the desired signal-to-noise performance is obtained. It will be appreciated that each successive replacement of the narrowband low pass channel partitions the image frequencies so that the next low pass cutoff is nearer to zero (or d.c.) frequency. This has the attendant advantage of including less noise and relatively more signal power in the low pass band. Compounding this advantage with signal coring in each of the bandpass subchannels, the final signal in the principle low pass channel has substantially improved signal characteristics with respect to noise performance and feature enhancement.

The third level filters 170 and 172 each prefilter the sampled image data I(x, y) by convolution with low pass arrays 178, 180. The prefiltered data is then subsampled over a larger area by convolution with sparse low pass arrays 182 and 184, to provide low pass prefiltered data of narrower bandwidth corresponding to the output of the low pass filter 122 of FIG. 21. This data is then further subsampled over a still larger area by convolution with a sparse low pass array 194 and with a set of feature oriented sparse matrices 192. These arrays are formed on patterns based on the principles discussed in connection with FIG. 21. The respective signals may be formed by networks similar to those discussed in connection with the vertical line feature detector of FIG. 26 and illustrated in FIG. 36.

A preferred embodiment of the invention employs for the feature detecting subchannels pairs of gradient detectors arranged back-to-back in accordance with International patent application No. PCT/GB79/00159. In the apparatus illustrated schematically in FIG. 21 the subchannels comprising both the bandpass channel 120 and the principal high pass channel 110 would preferably consist of such paired gradient detectors embodied in electronic networks of the kind illustrated in FIG. 37. FIG. 30 shows such gradient detectors operating in both the band pass subchannels and the principal high pass channel. A low pass filter 206 operating in the narrow band low pass subchannel is constituted by the network described in connection with FIG. 28.

Selected gradient detectors 210, 220, 230, 240 each constitute one of two pairs of back-to-back gradient detectors oriented to selected components of spatial fluctuations in image brightness, for example the paired horizontal and vertical gradient detectors illustrated in FIGS. 32 to 35. Each pair of gradient detectors generates a pair of symmetrical gradient signals which are mutually inverted and offset or delayed by a time corresponding to the sampling time of at least one picture element. The output signal provided by each gradient detector is thresholded by respective coring amplifiers 211, 221, 231 and 241. The cored output signals are applied to a summer 250 and the sum signal representing the combined cored output of all of these paired gradient detectors is combined in summer 212 with the signal in the narrow band low pass subchannel to form the principal low pass channel.

One of the pair of horizontal gradient line detectors constituting the 3×3 pel array of FIG. 22 convolved with the 7×7 pel array of FIG. 32 is shown in the network of FIG. 37. The incoming video image signal is applied to the network 340 for producing a low pass signal on line 342 corresponding to the pel weighting of FIG. 22. Network 340 has previously been described in connection with network 140 of FIG. 28. The low pass signal on line 342 is applied sequentially to 1-element delays 350-1 to 350-6 and to three 1-line delays 352-1, 352-2 and 352-3. The three and six element delayed dignals are applied to a differencer 351 and the result is applied, together with the fourth and seventh pels of the fourth and seventh lines (by way of 1-line delays 352-1 to 352-3, 1-element delays 353-1 to 353-6, differencer 354, and by way of 1-line delays 355-1 to 355-3, 1-element delays 356-1 to 356-6 and differencer 357) to the normalizing summer 358. The sum, representing the output of the gradient detector of FIG. 32 for example, is applied to the coring amplifier 211 (FIG. 30). The alternate horizontal gradient detector, shown in FIG. 33, consists of a similar network but with the negative inputs to the differencers 351, 354 and 357 taken prior to the first element delays 350-1, 353-1 and 356-1 respectively. For the pair of vertical gradient detectors as illustrated in FIGS. 34 and 35, the network 344 of FIG. 37 could be used after interchanging line and element delay units.

In the principle high pass channel, gradient detectors 260, 270, 280 and 290 each constitute one of two pairs of back-to-back gradient detectors oriented to selected components of spatial fluctuations in image brightness. For example, the paired gradient detector pel weightings shown in FIGS. 31A to 31D provide horizontal and vertical gradient sensitivity and consist of networks of the type illustrated in FIG. 7 which, with appropriate modification to the weights of summer 28, corresponds to FIG. 31B. Each high pass signal is thresholded by respective coring amplifiers 261, 271, 281 and 291 and applied to a summer 300 and therefrom, after appropriate delay by compensating delay element 302, added in summer 213 to the signal in the principal low pass channel to form the regenerated signal I' (x, y).

While the foregoing description is made in terms of analog components for implementing the principle of the invention, the use of the analogue network, while being most convenient for describing the invention, is merely exemplary of one approach. In a presently preferred implementation, digital networks may be substituted for the illustrated analog networks by straightforward application of conventional knowledge and skills. In another implementation of the disclosed network logic, the networks have been embodied in the programs of a digital computer. These programs, given the description in the foregoing paragraphs, were based on straightforward application of conventional programming skills and knowledge within the possession of the ordinarily skilled programmer.

I claim:

1. In electronic image processing apparatus of the kind in which an image signal representative of the brightness of a plurality of picture elements is applied to a low-pass filter operating in a low-pass channel and the output thereof is a filtered image signal representative of a low-frequency portion of an enhanced image, such apparatus having the additional feature that the low-pass channel is partitioned into a low-pass channel portion and a band-pass channel portion, the latter channel portion comprising a band-pass filter acting as a band-pass image feature detector, such band-pass filter further including (a) a subsidiary low-pass filter arranged to prefilter the image signal and (b) a sampling filter arranged to sample the prefiltered image signal and generate a band-pass feature signal, the improvement wherein said sampling filter comprises:

means responsive to said prefiltered image signal for generating first and second symmetrical gradient signals which are mutually inverted and offset by a time corresponding to the sampling time of at least one picture element.

2. The apparatus as claimed in claim 1 in which said band-pass filter further comprises:

means for modifying said first and second gradient signals to emphasize the band-pass image features in the enhanced image; and means for generating the filtered image signal from the first and second modified gradient signals.

3. The apparatus as claimed in claim 2 in which said means for modifying said first and second gradient signals comprises
   a threshold circuit having a signal output dependent upon the relation between its signal input and a threshold; and
   means for applying said gradient signals to the input of said threshold circuit.

4. In electronic image processing apparatus of the kind in which an image signal representing a plurality of picture elements, or pels, is applied to a low-pass electronic filter operating in a low-pass channel and to a high-pass electronic filter acting as an image feature detector in a high-pass channel, the signal output in each channel then being combined to generate an enhanced image, the apparatus having the additional feature that the low-pass channel is partitioned into a narrow band low-pass channel and a band-pass channel by operation of respective narrow band low-pass and band-pass filters, said band-pass filter acting as an image feature detector and including (a) a low-pass filter arranged to prefilter the image signal and (b) a sampling filter arranged to sample the prefiltered image signal so as to provide a band-pass image feature signal, the improvement wherein
   (a) said sampling filter comprises
      means responsive to the prefiltered image signal for generating a first gradient signal; and
      means responsive to the prefiltered image signal for generating a second gradient signal which is inverted and delayed by a time corresponding to at least one picture element with respect to said first gradient signal; and
   (b) said band-pass filter comprises
      means for modifying at least one of said first and second gradient signals in order to emphasize a band-pass image feature in the enhanced image; and
      means responsive to said first and second gradient signals after such modification for generating the band-pass image feature signal.

5. In electronic image processing apparatus of the kind in which an image signal representing the brightness of a predetermined array of picture elements, or pels, is applied to a low-pass filter operating in a low-pass channel and the output thereof is a filtered image signal respresentative of the low-frequency portion of an enhanced image, such apparatus having the additional feature that the signal in the low-pass channel is partitioned into respective signals in a narrow-band low-pass channel and a band-pass channel, the latter signal generated by operation of a band-pass filter acting as a band-pass feature detector, such band-pass filter further including (a) a subsidiary low-pass filter arranged to prefilter the image signal and (b) a sampling filter arranged to sample the prefiltered image signal in accordance with a pel sampling array having pel weightings that are designed to generate a band-pass image feature signal, the improvement wherein said sampling filter comprises
   first and second gradient detecting filters defined by first and second paired sampling arrays having non-zero pel weightings (a) regularly spaced at non-adjacent locations in both dimensions over the sampling array in order to regularly sample the prefiltered image signal and (b) so chosen as to generate first and second matched gradient signals which are mutually inverted and offset by a time delay corresponding to the sampling time of at least one picture element.

6. The apparatus as claimed in claim 5 in which said band-pass filter further comprises:
   means for applying a threshold to said first and second gradient signals to generate respectively modified gradient signals; and
   means for generating a filtered image signal from a combination of the first and second modified gradient signals and the signal in the narrow-band low-pass channel.

7. An electronic image processing apparatus of the kind in which image signals representing the brightness of a predetermined array of picture elements, or pels, are successively applied to complementary high-pass and low-pass electronic filters operating in respective high-pass and broad-band low-pass channels, the low-pass electronic filter further comprising a pair of secondary filters operating in respective band-pass and narrow-band low-pass channels to generate a signal in said broad-band low-pass channel, each secondary filter including (a) a low-pass prefilter based on a low-pass array of pel weightings so chosen as to generate a low-pass signal from the image signals and (b) a sampling filter based on a sparse array having non-zero pel weightings at regularly spaced row and column intervals that are directly related to the size of the prefilter array, the improvement wherein the sampling filter comprises
   at least one pair of gradient detecting filters for generating at least one pair of symmetrical gradient signals representative of brightness transitions in the image, the gradient detecting filters further being based on a pair of sparse sampling arrays having at non-adjacent locations in both dimensions regularly spaced non-zero pel weightings so chosen as to generate mutually inverted gradient signals that are time offset by at least one element of the image.

8. Electronic image processing apparatus responsive to sampled brightness data for generating a filtered image signal representative of an enhanced image, said sampled brightness data being derived from elemental portions of an image, said electronic image processing apparatus comprising:
   a high-pass filter responsive to the brightness data for generating a high-pass signal representative of small scale brightness fluctuations in the image;
   a low-pass filter for generating a low-pass signal representative of large scale brightness fluctuations in the image, said low-pass filter comprising
      a narrow-band low pass filter for generating a narrow-band low pass signal representative of the larger brightness fluctuations in the low-pass image signal,
      a band-pass filter for generating a band-pass signal representative of brightness fluctuations within a particular spatial pass-band of the image; said band-pass filter comprising (a) low-pass means for generating a prefiltered image signal from a set of filter coefficients arranged as an array of filter weights and (b) band-pass means for generating a pair of gradient signals by processing the prefiltered image signal with a set of filter coefficients arranged as a pair of sparse arrays of filter weights, each sparse array having at non-adjacent locations in both dimensions regularly-spaced non-zero weights that are directly related to the size of the prefilter array and so chosen as to generate respective first and second symmetrical gradient signals that are mutually inverted and time offset by at least one elemental portion of the image;

means for modifying said first and second symmetrical gradient signals to emphasize the brightness fluctuations within the spatial pass-band;

means for combining said modified gradient signals and said narrow-band low-pass signal to generate the low-pass signal; and means for reconstructing a filtered signal representative of an enhanced image from said modified low-pass signal and the high-pass signal.

9. An electronic filter responsive to a plurality of brightness signals for generating a filtered image signal representative of an enhanced image, said brightness signals being grouped into arrays corresponding to predetermined arrays of elements of an image, said filter comprising means for generating a low-pass signal by convolving the brightness signals with an array of filter weights chosen to generate a low-pass component of the arrayed brightness signals;

means responsive to the low-pass signal for generating a first gradient signal by convolving the low-pass signal with a sparse array of sampling weights arranged at non-adjacent locations in both dimensions at regularly spaced intervals corresponding to the size of the prefilter array, the values of the sampling weights being so chosen as to generate the gradient signal;

means responsive to the low-pass signal for generating a second gradient signal which is inverted and delayed by a time corresponding to at least one image element with respect to said first gradient signal;

means for comparing at least one of said first and second gradient signals to a predetermined threshold and accordingly modifying said signal; and means for combining said modified gradient signals and said low-pass signal to generate the filtered image signal.

* * * * *